Figure 1:
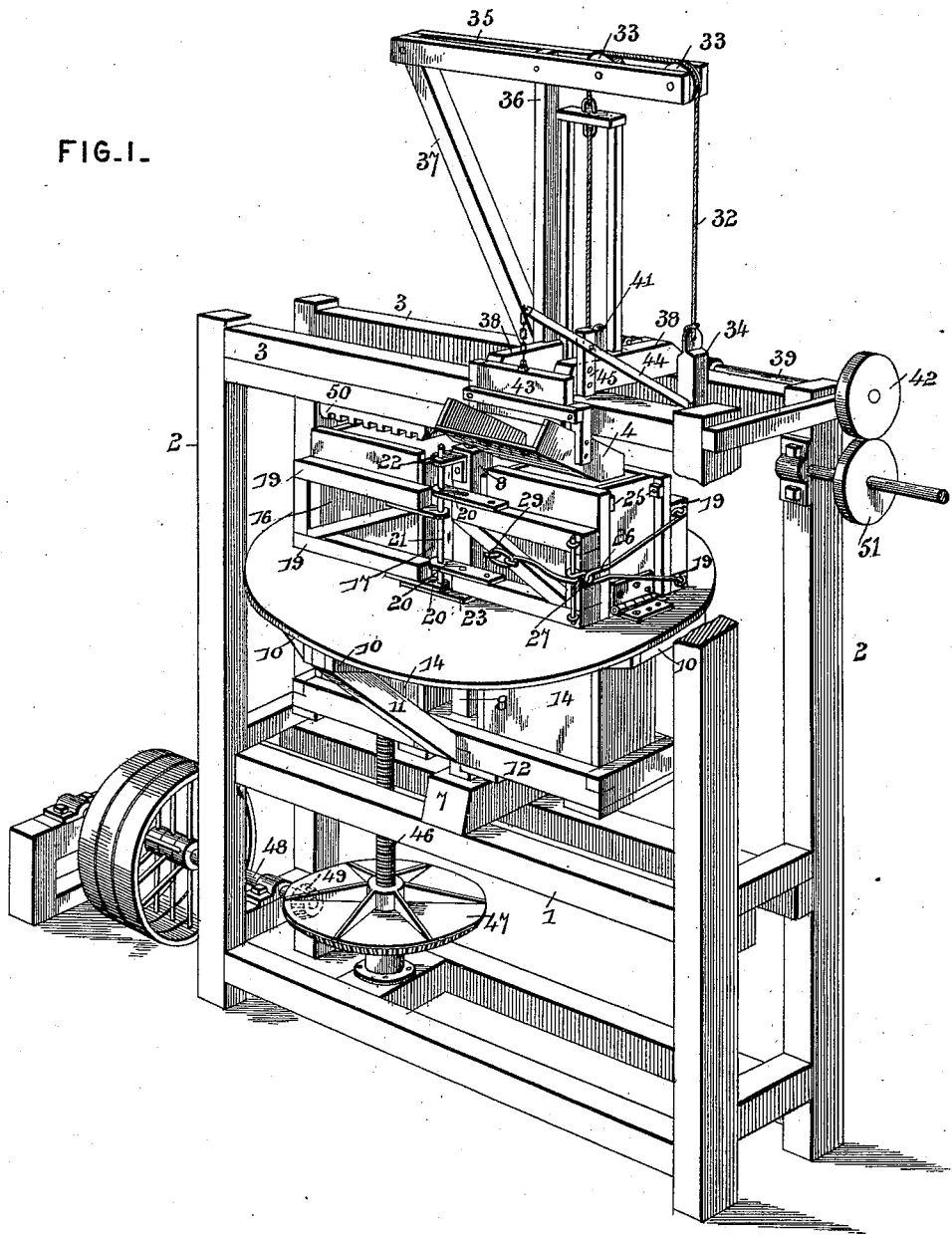

(No Model.) 2 Sheets—Sheet 1.

A. L. COX.
BALING PRESS.

No. 563,451. Patented July 7, 1896.

Witnesses
Jas. K. McCathran
V. B. Hillyard

Inventor
Allen L. Cox
By his Attorneys.
C. A. Snow & Co.

(No Model.) 2 Sheets—Sheet 2.
A. L. COX.
BALING PRESS.
No. 563,451. Patented July 7, 1896.
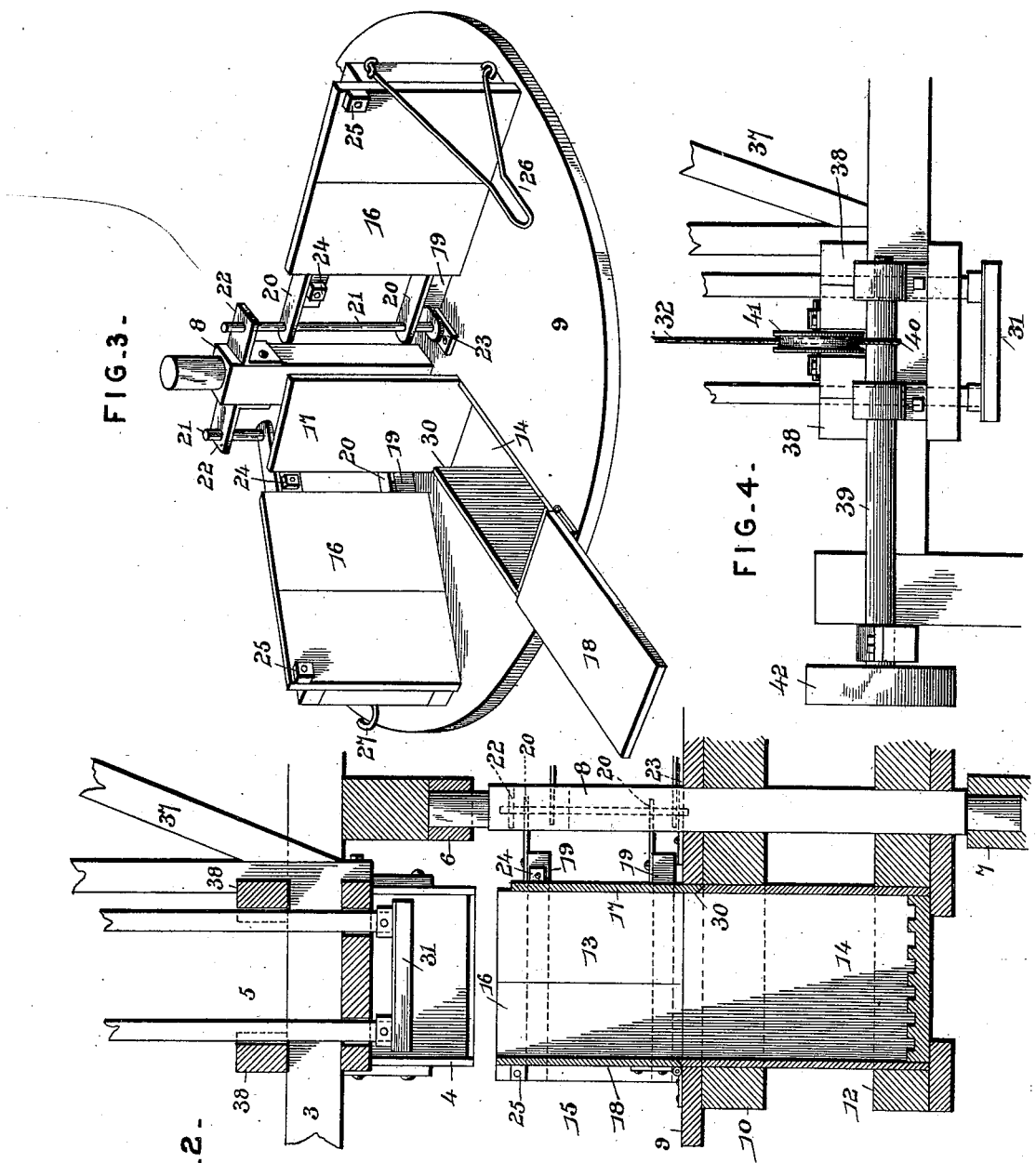
Witnesses
Jas. K. McCathran
V. B. Hillyard.
Inventor
Allen L. Cox
By his Attorneys.
C. A. Snow & Co.

UNITED STATES PATENT OFFICE.

ALLEN L. COX, OF WISE, ALABAMA.

BALING-PRESS.

SPECIFICATION forming part of Letters Patent No. 563,451, dated July 7, 1896.

Application filed March 28, 1895. Serial No. 543,477. (No model.)

*To all whom it may concern:*

Be it known that I, ALLEN L. COX, a citizen of the United States, residing at Wise, in the county of Chambers and State of Alabama, have invented a new and useful Baling-Press, of which the following is a specification.

This invention relates to that class of presses which are designed for baling cotton, hay, wool, and other commodities which are usually placed upon the market in a compact shape in the form of bales, and has for its object to provide a press which will combine at least two baling-chambers, the one adapted to have the cotton or other material compressed or packed therein by tamping, and the other to be subjected to a power-press, whereby the cotton previously packed by the tamping process is subjected to the required pressure to complete the baling, the two operations being performed simultaneously.

A further purpose of the invention is the combination, with the baling-chambers, of a tamping mechanism and a feed-controlling device, the latter being actuated by the tamping mechanism in its reciprocatory movements.

A still further purpose of the invention is the provision of a baling-chamber which can be readily opened to admit of ready access to the bale for purposes of tying and discharging the same, and which when closed will have its sides mutually bracing, so as to withstand the strain incident to the compression of the cotton or other material forming the bale.

Other objects will appear from the following description and the drawings hereto attached, in which—

Figure 1 is a perspective view of a baling-press embodying the essential features of the invention. Fig. 2 is a cross-sectional detail view of a baling-chamber, showing the relative disposition of the tamping mechanism and the feed-chute. Fig. 3 is a detail view of the upper portion of a baling-chamber, showing the relative position of the parts when opened to admit of access to or the ready discharge of the completed bale therefrom. Fig. 4 is a detail view of the lower portion of the plunger and the actuating mechanism therefor.

The framework, which is a substantial structure, comprises longitudinal sills 1, vertical standards 2, and upper longitudinal beams 3, which latter are parallel with the sills 1 and have the feed-chute 4 and counterbalanced rammer 5 attached thereto. Blocks 6 and 7 are secured to the opposing sides of the beams 3 and sills 1 and form bearings for the respective ends of the turn-post 8. A table or platform 9 is attached to and carried by the turn-post 8, and is braced from beneath by a framework 10 and stays 11. A strong frame 12 is located beneath the table 9 a proper distance and is bracingly attached to the lower end portion of the turn-post 8, the stays 11 extending from the frame 12 to the framework 10 to mutually brace each. The baling-chambers 13 are similarly constructed, and comprise a lower portion 14, which is closed in on four sides and extends from the frame 12 to the top side of the table or platform 9, and an upper portion 15, whose sides are adapted to be separated to admit of ready access to the bale, as most clearly indicated in Fig. 3. These baling-chambers 13 are located at diametrically opposite points and at an equal distance from the axial line of the turn-post 8, so that on rotating the table 9 each baling-chamber will be brought in register with the tamping mechanism and the power-press.

The upper portion 15 of the baling-chambers comprises similar sides 16, which are hinged at their inner ends, so as to swing outward in a horizontal plane, a removable end piece 17, and a hinged end piece 18, which is adapted to move in a vertical plane and fold upon the table 9 when lowered. The sides 16 have heavy cleats 19 secured to their outer faces and projecting a short distance beyond the rear edges, and have irons 20 fastened thereto and provided with vertical openings to receive pins 21, by means of which the said sides are hinged to the turn-post and table. A bracket 22 is secured to the upper portion of the turn-post, and its outwardly-extending end is apertured to receive the upper end of the pin 21, the lower end of the latter entering an opening formed in an iron 23, fastened to the top side of the table 9. A single pin 21 forms a support for two sides 16 on the same side of the baling-chambers. A stop 24 is located on the upper cleat 19 a sufficient distance from the inner edge of the side 16 to receive the edge portion of the end piece 17 between it and the rear edge of the said side, thereby sustaining the end piece 17 against outward displacement from pressure within the baling-chamber. A corresponding stop 25 is provided near the upper end of each side 16 near its outer edge to project over the rear side of the hinged end piece 18 for a purpose similar to the stop 24. Thus it will be seen that the end pieces are firmly braced and capable of withstanding the pressure to which the bales may be subjected. A swinging bail 26 is attached at one end to one side 16, and its opposite end, which is looped, is adapted to be engaged by the projecting end of a locking-lever 27, pivoted to the opposite side 16 and having a link at its inner end to engage with a hook 29, by means of which the parts are secured in locked relation. The end piece 17 has its lower portion beveled and fitted in a recess 30, formed in the table 9, thereby firmly securing said end piece in the located position when the baling-chamber is closed and in condition for forming the bale.

The tamping mechanism comprises a vertically-disposed rammer or plunger 31, which is suitably counterbalanced to return it to a normal position after being lowered to tamp or compress the material in the baling-chamber. The preferred form of counterbalance is a weighted cord or rope 32, which is attached at one end to the rammer 31 and passes over guide-pulleys 33, and has the weight 34 fastened to its opposite end. The guide-pulleys 33 are journaled on one end portion of a cross-beam 35, which is secured to a vertical standard 36 and strengthened at its opposite end by a brace 37. The rammer 31 is directed in its vertical movements by suitable guides 38, secured to the upper and lower sides of the longitudinal beams 3, said guides being short cross-bars provided in their opposing sides with notches to receive the side pieces of the rammer 31, which operate therein. A shaft 39 is journaled on one side of a longitudinal beam 3, and a rope or chain 40 is connected at one end thereto and at its opposite end to the upper portion of the rammer 31 and passes under a guide-pulley 41. When the shaft 39 is rotated in its bearings, the end portion of the rope or chain 40 attached thereto is wound up and causes the rammer 31 to descend and tamp the material fed into the baling-chamber. This shaft 39 may be rotated in any desired manner, preferably by means of a friction-pulley 42 on its outer end, which is adapted to engage with a corresponding friction-pulley 51, driven from any suitable source of power.

The feed-chute 4 has its delivery end terminating over the baling-chambers, so as to discharge the material therein, and is provided with a gate or cut-off 43, attached to one end of a lever 44, which is pivoted between its ends to a post 45, attached to the framework of the press, the opposite end of the lever 44 projecting within the path of the weight 34 to be engaged by the latter, whereby on the ascent of the rammer 31 the said lever 44 will be tripped and lift the gate 43 and permit the material to be baled to discharge into the baling-chamber. This gate or cut-off 43 is sufficiently heavy to close automatically when the lever 44 is released from the influence of the weight 34. Hence when the rammer descends to tamp the material in the baling-chamber the said gate 43 will close and shut off the supply to the baling-chamber.

A suitable power-press of any desired make will be disposed upon the sills 1 beneath the baling-chamber remote from the tamping mechanism, and, as shown, comprises a vertical screw 46, suitably journaled at its lower end and having a follower for engagement with its upper end, a rotatable feed-wheel 47, a counter-shaft 48, having a pinion 49 at its inner end to engage with and drive the feed-wheel 47, and provided at its outer end with the usual loose and tight pulleys, by means of which the feed-screw 46 is driven positively in either direction in the ordinary manner to advance or back the screw as desired. A platen 50 is secured on the beams 3 opposite the power-press to act in opposition thereto when compressing the bale.

When the press is in efficient service, the baling-chambers, or the upper portions thereof, are held in locked relation, and are disposed so that one baling-chamber comes directly beneath the tamping mechanism and the other above the power-press. The material to be baled is supplied to the baling-chamber beneath the tamping mechanism through the chute 4, and after a sufficient amount has been supplied to the said chamber the rammer 31 is lowered by the mechanism herein specified to tamp or compress the said material. This operation is repeated until the baling-chamber is sufficiently packed to form a bale of the required size, after which the table or platform 9 is turned a half-revolution to bring the filled baling-chamber directly over the power-press and the empty baling-chamber in position to be filled in the manner just described. While the empty baling-chamber is filling in the manner described the material in the filled baling-chamber is subjected to the action of the power-press, which forces the material from the lower portion 14 of the baling-chamber into the upper portion 15, where the final pressure is given to complete the bale, which latter when formed is tied and discharged from the baling-chamber by unlocking the upper portion of the latter and separating its parts, as shown in Fig. 4.

Thus it will be seen that a saving of time results from using a press of the construction herein set forth, because while a bale is in course of formation in one chamber the previously partially-formed bale is completed in the second chamber, both operations being performed synchronously.

In providing a press to meet the various demands of the market and embodying the vital features of the present invention, it is manifest that various changes in the form, proportion, and the minor details of construction may be resorted to without departing from the principle or sacrificing any of the advantages of this invention.

Having thus described the invention, what is claimed as new is—

1. In a baling-press, the combination of a turn-post, a horizontal rotatable platform carried by the turn-post, baling-chambers disposed at diametrically opposite points, each comprising a lower closed portion terminating in the plane of the platform and an upper part, the latter formed of removable inner end pieces, outer end pieces hinged at their lower ends to and supported when lowered by the platform, and swinging sides adapted to open outwardly at their free ends over the platform and having inwardly and rearwardly extending irons, vertical pins attached at their ends to the turn-post and platform and passing through the opposing ends of the said irons to form a hinge or pivotal support for the inner ends of the said sides, and locking provisions substantially as shown for securing the sides and ends of the upper part of the baling-chambers in closed relation.

2. In a baling-press, the combination with a baling-chamber and a counterbalanced rammer, of a feed-chute and a gate, or cut-off, for the chute independent of the rammer and controlled by its counterbalance, whereby on the descent of the rammer the gate will close by gravity, and vice versa, substantially as set forth.

3. A baling-press comprising in its organization a rotatable platform provided with oppositely-disposed baling-chambers whose upper portions are adapted to be opened to admit of access to the bale for purposes of tying and discharging, a power-press to complete the formation of the bale and force the latter from the lower portion of its chamber into the upper part thereof, a counterbalanced rammer, a feed-chute, and a gate or cut-off for the chute independent of the rammer and actuated by the counterbalance thereof, whereby on the descent of the rammer the gate will close by gravity and vice versa, substantially as and for the purpose specified.

In testimony that I claim the foregoing as my own I have hereto affixed my signature in the presence of two witnesses.

ALLEN L. COX.

Witnesses:
WM. C. DEAN,
J. W. A. VARDAMAN.